United States Patent [19]

Sandvick

[11] Patent Number: 4,810,407

[45] Date of Patent: Mar. 7, 1989

[54] NON-HOMOGENIZED MULTI-SURFACE POLISH COMPOSITIONS

[75] Inventor: Paul E. Sandvick, Racine, Wis.

[73] Assignee: S. C. Johnson & Son, Inc., Racine, Wis.

[21] Appl. No.: 94,064

[22] Filed: Sep. 2, 1987

Related U.S. Application Data

[63] Continuation of Ser. No. 844,449, Mar. 26, 1986, abandoned.

[51] Int. Cl.$^4$ .................... C09G 1/04; C09G 1/14; C11D 3/37
[52] U.S. Cl. .................... 252/90; 106/3; 106/11; 252/170; 252/174.15; 252/174.21; 252/174.22; 252/174.28; 252/174.24; 252/312; 252/351; 252/DIG. 1; 524/230; 524/308; 524/311
[58] Field of Search ............ 106/10, 3, 11; 252/174.23, 312, 351, 174.15, 174.21, 174.22, 174.24, 170, 90, DIG. 1; 524/230, 308, 311

[56] References Cited

U.S. PATENT DOCUMENTS

| | | | |
|---|---|---|---|
| 2,949,373 | 8/1960 | Kendall et al. | 106/10 |
| 3,380,944 | 4/1968 | Kay et al. | 260/28.5 |
| 3,488,311 | 1/1970 | Burdick et al. | 260/29.6 |
| 3,929,492 | 12/1975 | Chapman et al. | 106/10 |
| 3,979,342 | 9/1976 | Baidins et al. | 260/2.5 N |
| 3,984,368 | 10/1976 | Teer et al. | 260/29.6 A |
| 4,013,457 | 3/1977 | Liebowitz | 106/10 |
| 4,115,098 | 9/1978 | Stoll | 71/71 |
| 4,163,673 | 8/1979 | Dechert | 106/11 |
| 4,238,520 | 12/1980 | Miller et al. | 426/573 |
| 4,347,333 | 8/1982 | Lohr et al. | 106/3 |
| 4,354,871 | 10/1982 | Sutton | 106/3 |
| 4,358,573 | 11/1982 | Verbrugge | 526/272 |
| 4,497,919 | 2/1985 | Varga et al. | 524/10 |
| 4,613,646 | 9/1986 | Sandvick | 524/506 |

FOREIGN PATENT DOCUMENTS

2401972  3/1979  France .
1541463  2/1979  United Kingdom .

OTHER PUBLICATIONS

Service Bulletin GC-36-Revised, entitled "Carbopol Water-Soluble Resins", distributed by B. F. Goodrich.
*Detergents & Specialties,* May, 1969, "Formulating Modern Furniture Polishes", W. Hackett, pp. 54, 56, 58 and 137.
European Patent Search Report and Annex No. EP 86 10 4916 2 pages.
Patent Abstracts of Japan, Abstract for Pat. No. 54-75487 to Mitsubishi Kasei Kogyo K.K., vol. 3, No. 95 (C-55) Aug. 11, 1979, p. 139.
CTFA Cosmetic Ingredient Dictionary, pp. 40 and 41, published by the Cosmetic, Toiletry and Fragrance Association, Inc., 1982.
A. T. Florence & D. Whitehill, Journal of Colloid and Interface Science, vol. 79, No. 1, Jan. 1981, pp. 243-256.

*Primary Examiner*—Paul Lieberman
*Assistant Examiner*—Linda D. Skaling

[57] ABSTRACT

A non-homogenized oil-in-water, essentially wax free emulsion cleaner polisher composition that resists phase separation. The composition comprises from about 75 to 99% water, 0.5 to 12% film former, 0.1 to 5% nonionic emulsifier and 0.01 to 0.3% thickener. The composition may be dispensed from pump, trigger or squeeze sprayers. Various methods are also disclosed to formulate the composition.

31 Claims, No Drawings

NON-HOMOGENIZED MULTI-SURFACE POLISH COMPOSITIONS

This is a continuation of co-pending application Ser. No. 844,449, filed on Mar. 26, 1986, abandoned.

CROSS REFERENCE TO RELATED APPLICATION

This application contains subject matter related to copending, commonly assigned, application Ser. No. 723,021, filed Apr. 15, 1985, now U.S. Pat. No. 4,613,646.

BACKGROUND OF THE INVENTION

1. Field of the Invention

This invention relates to surface treating compositions for household items such as furniture, countertops and other hard surfaces. More particularly, this invention relates to cleaner polishes which are essentially wax free, nonhomogenized emulsions suitable for use with pump and trigger spray applicators, and which exhibit uniform, nonstreaky high gloss films, as well as long lasting shine and rapid fingermark repair.

2. Description of the Prior Art

Various compositions prepared and used in various forms including pastes, solutions, lotions and creams, are known for cleaning and polishing of household items such as furniture, appliances and countertops. Such products are commonly available as pourable liquids, pump or trigger spray products or aerosols.

In recent years, emulsion cleaner polishes, including those containing a relatively high water content, have been popular primarily because of ease of use, good performance and reduced costs.

Accordingly, it is desirable to formulate an oil-in-water cleaner polish which will spray from a pump, trigger or squeeze spray dispenser and will exhibit the good film characteristics of a water-in-oil cleaner polish. Water-in-oil compositions are not well suited for use in such dispensers because they result in a stream of product being dispensed instead of the desirable fine mist.

Oil-in-water compositions have traditionally been poor performers because of the tendency to streak. Hence, there has been a tradeoff between good syrayability from pump, trigger and squeeze spray applicators and the tendency to streak.

The present invention overcomes this problem by offering an oil-in-water composition which provides for uniform film deposition.

Emulsion cleaner polishes are popular and widely accepted. However, there is a trade-off between uniform film deposition and the ease of application of oil-in-water emulsions. The uneven distribution of polishing agents with oil-in-water compositions leaves a noticeable streaking on the treated surface. This is also seen in the non-uniform luster per given area of surface cleaned. These disadvantages have been overcome with the composition of the present invention.

Sutton, U.S. Pat. No. 4,354,871 relates to an emulsion cleaner polish for the treatment of furniture surfaces which imparts excellent gloss and cleaning properties. The emulsion contains a film former such as silicone, wax, resin, nondrying oil and mixtures thereof, a low level of hydrocarbon solvent, water, a surfactant, and an alpha olefin monomer having a carbon content of $C_{10}$ to about $C_{18}$. The alpha olefin, when present in fairly low amounts, strongly attacks oil borne stains without substantial detriment to the gloss characteristic of the film. Additionally, the alpha olefin contributes to the leaving characteristics of the cleaner polish when applied to the substrate.

Sutton differs from the present invention in a number of ways. First, the alpha olefin maleic anhydride polymers of the present invention have a longer carbon chain length and are polymers whereas the alpha olefins of Sutton are monomers. Furthermore, Sutton teaches that smearing is inherent and accompanies a high gloss polish, but the present invention imparts a high gloss with reduced smearing. The alpha olefin polymers of the present invention contribute to a much better finger print repair than the monomers of Sutton. Further, Sutton discloses a homogenized oil-in-water composition as opposed to the present invention.

British Pat. No. 1,541,463 presents a process for preparing a water-in-oil-in-water emulsion. The composition may be used as a fundamental form for various products emulsified as dispersions, such as cosmetics, drugs, foods and drinks.

The present invention differs from the British Patent in a number of ways. The British Patent is concerned with a cosmetic composition whereas the present invention is a cleaner polisher product. The British Patent does not disclose the use of silicones and solvents. The British Patent discloses the formation of a water-in-oil emulsion followed by dispersion in water via homogenization to make a water-in-oil-in-water product. Although the present invention discloses a two step process similar to that of the British Patent, the present invention is non-homogenized. Indeed, the present invention is preferably a one step process in which the oil phase is simply added to a water phase without homogenization. A key difference between the British Patent and the present invention is the requirement for homogenization.

Miller, U.S. Pat. No. 4,238,520 relates to a comestible margarine-like composition which is an oil in water emulsion made with thickeners. The present invention differs in a number of ways.

Specifically, Miller discloses homogenization whereas the present invention is preferably non-homogenized. Miller discloses a non-flowable, highly viscous plastic margarine-like consistency product whereas the present invention is a lower viscosity, flowable, even sprayable liquid. Further, Miller teaches edible thickeners such as gums and cellulosic thickeners including Avicel. Those skilled in the art will note that thickeners such as Avicel impart a dull appearance to polishing films. The present invention is concerned with non-cellulosic non-gum thickeners that are efficient suspending agents at low use levels, i.e., less than about 0.3% of thickener versus combined cellulosic thickener levels of 0.5% or more in Miller.

OBJECTS OF THE INVENTION

It is therefore an object of this invention to present an oil-in-water cleaner polisher emulsion suitable for use in trigger and pump spray applicators.

It is another object of this invention to present an emulsion composition having enhanced film uniformity and increased shine over other oil-in-water cleaner polisher emulsions.

It is a further object of this invention to present a cleaner polisher emulsion in an oil-in-water composition which does not streak upon drying, conceals fingerprints and presents a full luster finish upon hard surfaces.

It is a further object of this invention to present an oil-in-water cleaner polisher emulsion which does not have to be homogenized to form a stable product.

SUMMARY OF THE INVENTION

The present invention is an emulsion cleaner polishing composition which comprises water in an amount of about 75 to 99% by weight of the composition, a film former as an essential component, in amounts of approximately 0.5% to 20% by weight of the composition, a substantially lower hydrophylic lipophylic balance (HLB), a nonionic emulsifier in the amount of about 0.1 to 5% by weight of the composition to include one or more lower HLB emulsifiers and, optionally, minor amounts of one or more higher HLB emulsifiers, a thickener such as a carbomer, for example Carbopol, present in the amount of about 0.01% to about 0.3% by weight of the composition, and a polyethoxylated amine surfactant such as Ethomeen. The Carbopol/emulsifier-/Ethomeen serves to emulsify/stabilize the composition. In addition, an alpha olefin maleic anhydride polymer in an amount of up to about 5% by weight of the composition may optionally be added to substitute for traditional wax components typical within cleaner polisher compositions. The alpha olefin of the alpha olefin maleic anhydride polymer has carbon content of approximately $C_8$ to about $C_{30}+$. The polymer would lend additional permanence and luster to the shine rendered by the film forming product. However, it is not essential to the functioning of the composition itself.

DETAILED DESCRIPTION OF THE PREFERRED EMBODIMENTS

The preferred embodiment of the present invention is an oil-in-water composition which is essentially a wax-free, silicone containing cleaner polish, which contains an alpha olefin maleic anhydride polymer which is substituted for all or part of the wax components traditionally used in silicone containing cleaner polishes.

The non-homogenized emulsions of the present invention can be dispensed with low pressure delivery systems such as pumps, trigger sprays, and squeeze sprays as well as conventional relatively high pressure delivery systems such as aerosol containers. The non-homogenized emulsions of the present invention are to clean and polish household surfaces, provide a uniform shine or luster across the entire surface so treated and have the remarkable ability to conceal fingerprints on the surface. The invention is comprised of the essential components of water, film former, emulsifier surfactant and, optionally, an alpha olefin maleic anhydride polymer. These components are emulsified within the water as the external phase and suspended uniformly in the water by the addition of a thickener such as Carbopol.

Nonionic emulsifiers suitable for use in the present invention include, but are not limited to, sorbitan esters of oleic, stearic, isostearic, palmitic, and lauric acids; polyethoxylated sorbitan esters having up to about 20 ethylene oxide units; the mono and diglyceride of fat forming fatty acids; and combinations thereof. Generally, nonionic emulsifiers having low HLB values are employed, though small amounts of emulsifiers with high HLB values may be used in combination with low HLB value nonionic emulsifiers. Exemplary nonionic emulsifiers are Span and Tween emulsifiers available from ICI Americas, Inc.; and Monomide emulsifiers available from Mona Industries, Inc., and polyglyceryl fatty acid ester emulsifiers such as Witconal 14, available from Witco. The nonionic emulsifiers are present in an amount of about 0.1 to 5% by weight based on the total weight of the composition exclusive of any propellents. Preferably the nonionic emulsifier is present in an amount of about 0.6 to 1.5 weight percent.

Suitable organic solvents which may be optionally included in the compositions of the present invention are those hydrocarbon solvents conventionally employed in household cleaner polishes. Suitable hydrocarbon solvents are linear, branched or cyclic aliphatics having a carbon content of about $C_7$ to $C_{10}$, have a kauri-butanol value of about 20 to about 50, boiling ranges in the range of about 60° to 210° C., and preferably in the range of about 95° to 150° C. Isoparaffinic hydrocarbon solvents such as those commercially available from Exxon Corp. under the tradename Isopar, and Soltrol, commercially available from Phillips Petroleum Corp. and Shell Sol. commercially available from Shell Oil are preferred because they are substantially odor free. Other suitable solvents, include hexane, heptane, naptha, Stoddard solvents, etc. The hydrocarbon solvent is present in the range from about 0.5 to about 20% by weight based on the total weight of the composition. Preferably however, the solvent will be present in an amount of about 2 to 8% by weight of the composition.

Suitable non-wax film formers useful in accordance with the present invention are those film formers conventionally employed in emulsion cleaner polish compositions and include the organic polysiloxanes and non-drying oils. Preferred film formers for the compositions are the organic polysiloxances including polydialkylsiloxane, polyalkylarysiloxane, and polydiarysiloxane. Polysiloxanes such as polydimethylsiloxane, polydiethylsiloxane, polymethylethylsiloxane, polymethylphenylsiloxane and copolymers of two or more of such siloxanes are exemplary of the materials which can be used. Polydimethylsiloxane is especially preferred, particularly polydimethylsiloxanes having viscosities ranging from about 5 to 50,000 centistokes and preferably from about 100 to 10,000 centistokes and mixtures thereof.

In addition to the silicones, non-drying oils can be used as the film former either alone or in combination with the silicones. Examples of suitable non-drying oils include heavy and light mineral oils commercially available under the tradenames Marcol or Primol from the Exxon Corp.

The film formers are present in an amount of about 0.5 to about 20% based on the total weight of the composition. In silicon containing compositions, silicone should be present in an amount of about 0.5 to 6 weight percent. Non-drying oil containing compositions preferably contain from about 4 to about 20 weight percent non-drying oil.

The alpha olefin maleic anhydride polymers optionally included in the compositions of this invention are present in amounts of up to about 5% by weight of the total composition. Silicone containing compositions should contain preferably from about 0.1 to 1% alpha olefin maleic anhydride polymer; and more preferably from about 0.2 to about 0.4 weight percent.

The alpha olefin maleic anhydride polymers useful in the present invention are polymers of maleic anhydride and at least one 1-alkene selected from the group consisting of (a) polymers of maleic anhydride and at least one 1-alkene having about 12–30 carbon atoms and (b)

polymers of maleianhydride, at least one lower 1-alkene and at least one higher 1-alkene. Preferably, the polymers are comprised of about 49 to 60 mole percent of maleic anhydride and about 40 to 51 mole percent of 1-alkene. For those polymers containing both higher-1 alkene and lower 1-alkene, the monomer content preferably if from about 49 to 60 mole % maleic anhydride, from about 10 to 40 mole % of at least one lower 1-alkene, and 10 to 40 mole % of at least one higher 1-alkene having more than 18 carbon atoms. These polymers are described in U.S. Pat. No. 4,358,573 which patent is expressly incorporated by reference for its disclosure of suitable alpha olefin maleic anhydride polymers.

The anhydride included in the alpha olefin maleic anhydride polymers is most preferably maleic anhydride. However, other maleic anhydrides can be utilized in this formation of the polymers such as methylmaleic anhydride, dimethylmaleic anhydride, fluoromaleic anhydride, methylethyl maleic anhydride and the like. Accordingly, as employed herein the term "maleic anhydride" includes such anhydrides in whole or in part. It is preferred that the anhydride be substantially free of acid and the like before polymerization.

The lower 1-alkenes suitable in the formation of the polymers have from 4 to 18 carbon atoms and include the following: 1-butene, 1-pentee, 1-hexene, 1-heptene, 1-octene, 1-nonene, 1-decene, 1-dodecene, 1-tetradecene, 1-hexadecene, 1-heptadecene, 1-octadecene, 2-methyl-1-butene, 3,3-dimethyl-1-pentene, 2-methyl-1-1-hpetene, 4,4-dimethyl-1-heptene, 3,3-dimethyl-1-hexene, 4-methyl-1-pentene and the like. Mixtures of the above materials can be utilized. It is preferred to utilize straight chain 1-alkenes having from 8 to 18 carbon atoms, and accordingly, 1-octene, 1-nonene, 1-decene, 1-dodecene, 1-tetradecene, 1-hexadecene-1-heptadecene, 1-octadecene, and mixtures thereof are preferred. These materials should be substantially free of diolefin as an impurity which causes gel formation and crosslinking. However, small amounts, i.e., less than 2 percent, can be present without causing undue gel formation and crosslinking in the resulting polymers. Also as noted above, either single materials, i.e., 1-octene, 1-decene, etc., can be used, or mixtures of these materials may be utilized.

The higher 1-alkenes utilized in the formation of the polymers have more than 18 carbon atoms. The alpha olefins may be pure materials or may be mixtures of various higher 1-alkenes such as mixed $C_{20}$, and $C_{22}$ and $C_{24}$ 1-alkenes and the like. Suitable alpha olefins include the following: 1-eicosene, 1-docosene, 1-tetracosene, 1-hexacosene, 1-octacosene, 1-triacontene, 1-dotriacontene, 1-tetratriacontene, 1-hexatriacontene, 1-octatriacontene, 1-tetracontene, 1-dotetracontene, 1-tetratetracontene, 1-hexatetracontene, 1-octatetracontene, 1-pentacontene, 1-hexacontene and mixtures thereof. Both pure alkenes and mixed alkenes can be utilized. Typical mixtures of $C_{30}+$ 1-alkenes are described in U.S. Pat. No. 3,553,177. Typically, these mixed higher alkenes are primarily even chain alpha olefins. As with the lower 1-alkenes, the higher 1-alkenes should be free essentially of diolefins as impurities. Although small amounts of diolefins, typically less than 2 percent, can be tolerated as impurity in the higher 1-alkene monomer, it is preferred that the level of diolefins in the monomer be kept to a minimum, generally less than 1 percent and preferably less than 0.3 percent, to minimize undue crosslinking and insolubilization of the resulting polymer.

The preferred higher 1-alkenes are $C_{20}$-$C_{24}$ mixtures, $C_{24}$-$C_{28}$ mixtures, and $C_{30}+$ mixtures.

For those alpha olefin maleic anhydride polymers formed from maleic anhydride and at least one 1-alkene having 12 or more carbon atoms, the 1-alkene can be either a pure 1-alkene or mixtures of these materials.

The preferred alpha olefin maleic anhydride polymers are polymers of maleic anhydride, a higher 1-alkene and a lower 1-alkene.

Each of the above three monomers must be present in the preferred alpha olefin maleic anhydride polymers in certain specific amounts in order to achieve the desired result. In other words, if too much higher 1-alkene is included the polymer is not sufficiently soluble while if sufficient higher 1-alkene is not included, the film is not sufficiently anchored.

The polymers also may include minor portions of other modifying monomers. These monomers should be present in small quantities generally less than 3 mole percent. The purpose of these monomers is to modify one or more properties of the resulting polymer. Suitable modifying monomers include crosslinking agents such as divinylbenzene and the like.

As is well known in the art, polymers including maleic anhydride are essentially alternating polymers with maleic anhydride alternating between random comonomers. The alternating backbone occurs without regard to the relative ratio of the reactants. This phenomenon is described in various patents noted below relating to the process of preparing the polymers. Accordingly, the alpha olefin maleic anhydride polymers will contain from about 49 to 60 mole percent of maleic anhydride. Under some conditions such as very high initiator levels, it is possible to include some small excess of maleic anhydride relative to the comonomer in these polymers. The amount of 1-alkene will vary from about 50 to 40 mole percent. For the preferred polymers, the amount of lower 1-alkene monomer present in the polymers is from about 10 to 40 mole percent while the amount of higher 1-alkene is similarly from about 20 to 40 mole percent. The most preferred polymers include from 49 to 55 mole percent maleic anhydride and from about 10 to 30 mole % lower 1-alkene monomer and from about 10 to 40 mole % higher 1-alkene. The optimum alpha olefin maleic anhydride polymers include about 50 mole % maleic anhydride, about 10 mole % lower 1-alkene and about 40 mole % higher 1-alkene.

The alpha olefin maleic anhydride polymers may be prepared by any of a number of conventional polymerization processes including polymerization processes as set forth in U.S. Pat. No. Re. 28,475, U.S. Pat. Nos. 3,553,177, 3,560,455, 3,560,456, 3,560,457, 3,488,311 and 4,358,573.

The polymers are generally low molecular weight materials having a number average molecular weight within the range of from 3,000 to 15,000 and preferably within the range of from 3,000 to 10,000.

The alpha olefin maleic anhydride polymers are used in the same manner as traditional waxes and wax components in silicone containing oil-in-water compositions. The alpha olefin maleic anhydride polymers are incorporated into the non-homogenized formulas of the present invention to render the uniform, long lasting high-gloss, self-healing film formed upon surfaces to be cleaned. The polymer enhances the effect of erasing fingerprints and smudges and the like. The alpha olefin maleic anydride polymer has been found to increase the integrity of the film formed by the film formers with the film being anchored more securely to the surface than films from conventional polishes.

The use of the alpha olefin maleic anhydride polymers in the present composition has been found to retard deterioration of formed films and to impart a self leveling flowing action which enhances the erasure of fingerprints and smudges. Also, in conjunction with the film formers and the surfactant emulsifiers, the alpha olefin maleic anhydride polymers promote a uniform shine and luster over the entire surface to be cleaned and polished. Consequently, application of the cleaner polisher composition of the present invention provides surfaces with uniform, long lasting shine, and a self erasing film which causes fingerprints and other blemishes to become erased by the flowing action of the film itself.

In addition to the aforesaid ingredients, minor amounts of preservatives and fragrances can be utilized in the composition to provide improved stability to the compositions and impart a desirable odor. Preservations such as formaldehyde are commonly employed in cleaner polisher compositions.

Another optional, but preferred component of the cleaner polish compositions of the present invention is a low molecular weight oily material often identified and used as a dielectric oil. These oily materials are referred to herein as coupling oils. Coupling oils act in part to anchor the film to the substrate and also aid in solubilizing the alpha olefin maleic anhydride polymer. Suitable coupling oils for use in the cleaner polishes of this invention include the various branched alkyl benzenes, polybutene, and mixtures of branched alkyl benzenes with polybutene. Preferred coupling oils for silicon containing compositions are a branched alkylbenzene such as Dichevrol 100 available from Chevron, and mixtures of a branched alkyl benzene with polybutene such as Dichevrol 500 available from Chevron. Dichevrol 500 is a blend of 25% polybutene (molecular weight 950) and 75% of a branched alkylbenzene having 15 carbon atoms or more. Preferred coupling oils for nondrying oil containing compositions are polybutenes of molecular weight of about 95 to 2,700 such as Polybutene 128 (molecular weight 2,700) available from Chevron and Parapol 2500 from Exxon. Parapol 2500 is a polymer of isobutylene-butene copolymers having a molecular weight of 2500. The coupling oil, when used in the composition of the present invention, should be present in the amount of about 0.05 to about 5% and preferably in an amount of about 0.1 to about 3 weight percent.

As previously stated, the present invention offers the advantages of high gloss, long lasting shine, uniform shine, and rapid finger mark repair. These benefits may be accentuated with the use of alpha olefin maleic anhydride polymer and coupling oil in conjunction with the nonionic emulsifiers and film formers.

The system is thickened and stabilized by the addition of a thickener such as the carbomers. Carbomers are polymers of acrylic acid crosslinked with a polyfunctional agent. The carbomers are sold under the tradename Carbopol by B.F. Goodrich, and among these, Carbopol 941 is preferred. The Carbopols may also serve a function in emulsifying the composition. Other thickeners may also be used and should be added in sufficient amounts to give the desired thickening/suspending effect. In addition, a small amount of an ethoxylated amine such as the Ethomeens from Akzo Chemie America, Armak Chemicals (Akzo/Armak) may also be added to enhance thickening/stabilizing, and may also aid in formation of an emulsion.

To activate the thickening/stabilizing action of the Carbopols, they should be neutralized with a base, and preferably an inorganic base such as sodium hydroxide, potassium hydroxide or ammonium hydroxide. When an organic base is used, triethanolamine, or Quadrol from BASF is preferred.

Preferably, the inorganic base, potassium hydroxide, is added to the Carbopol 941. Optionally, an ethoxylated amine such as the 15 mole ethoxylate Ethomeen C/25A, and more preferably, such as the 50 mole ethoxylate Ethomeen 18/60 is combined with the neutralized Carbopol 941 to further thicken/stabilize the composition. The Ethomeen is present in an amount of about 0.015 to 0.5% by weight of the composition.

The compositions of this invention may be made by a number of different methods, each designed for a specific end product and incorporating the various optional ingredients. For example, it is possible to form a nonhomogenized cleaning polishing composition by forming a conventional oil-out emulsion and then adding it to the Carbopol thickened water.

Another method is to eliminate the step of forming an oil-out emulsion. Rather, the oil phase for this oil-out emulsion is simply added to the thickened water under moderately vigorous agitation. Without wishing to be bound by theory, presumably, the oil disperses initially as tiny droplets suspended in water. The droplets then appear to imbibe water to form droplets of water-in-oil emulsion, which are suspended in the thickened water. Accordingly, in this configuration, and the one described in the previous paragraph, the composition appears to assume the profile of a water-in-oil-in-water emulsion.

When it is desired to utilize Ethomeen 18/60 surfactant, two different processes for incorporating it into the composition may be used. One method is to include the Ethomeen with the oil phase ingredients, or, alternatively, it can be added to the water phase.

If the Ethomeen is added with the oil phase ingredients, the resulting product is somewhat viscous, has relatively large particle size resulting in a grainy appearance, and most importantly, is stable to phase separation.

If the Ethomeen is added to the water phase, the resulting product possesses a low, almost water thin viscosity, and small particle size which contributes to a very smooth non-grainy appearance. Moreover, although the composition is unstable to phase separation by "creaming", the cream phase readily redisperses.

When the Ethomeen is incorporated into the product, the composition may be made by the phase inversion process. For example, the Ethomeen may be incorporated into the water phase, and separately, the Carbopol is combined with the oil phase ingredients to form a slurry. The water phase is added to the oil phase and an oil-out emulsion is formed. However, as more water is added, the oil-out emulsion inverts to form the nonhomogenized emulsion of the present invention.

In the phase inversion technique herein discribed, the initial product viscosity varies depending on the rate of addition of the water phase to the oil phase. For example, if the water phase is added slowly, the resulting emulsion inverts at a later point in the water addition step, and the product is quite viscous, almost paste like.

If the water phase is added rapidly to the oil phase, the emulsion inverts at an early stage of water addition, and the resulting product has a relatively low viscosity.

Notwithstanding, it is contemplated that it is possible to form a creamy lotion, or even a paste, simply by increasing the level of thickeners in the product.

The non-homogenous polishing composition can be packaged in bottles or cans or other containers at ambient pressure for application with a polishing cloth or the like. The emulsion composition can also be packaged into low pressure packages with pump and trigger spray applicators and the like.

Alternatively, the emulsion compositions can be charged to an aerosol type pressure package with a suitable propellent. Pressure packaging of the cleaner polish composition can be accomplished, for example, by charging aerosol cans using standard aerosol charging techniques with from about 5 to 30% by weight of hydrocarbon liquid propellents such as propane, butane, isobutane, LPG (liquified petroleum gas) and mixtures thereof, or other liquid propellents such as flourocarbons, dimethylether, and the like, and from about 70 to 95% of the cleaner polish composition. As an alternative, compressed gases such as carbon dioxide and nitrous oxide may be used for pressure packaging. A wide variety of other packaging techniques may also be used. These features, being well known to those skilled in the art, will not be elaborated on herein.

By the term non-homogenized, it is meant that the composition forms a homogeneous liquid or paste without being subjected to high shear forces. It should be noted that it is state of the art to subject conventional oil-in-water compositions to high shear forces in order to mix the separate phases and prevent phase separation, in a process termed homogenization. The present invention does not require the application of high shear forces to produce a homogeneous composition.

Although nonhomogenized emulsions are the preferred embodiment of the present invention, it is contemplated that one skilled in the art could homogenize the emulsion and obtain a useable product. It will be equally apparent to those skilled in the art that the present invention will simplify and reduce cost of processing because expensive homogenization equipment is not required.

The following are examples of the non-homogenized emulsion surface treating compositions of the present invention. These examples are offered to illustrate the compositions of the present invention without limiting the scope and spirit of the invention:

EXAMPLE 1

Example 1 demonstrates a wax-free, water-out, pump, trigger, and squeeze sprayable cleaner polish composition which, unlike traditional pump, trigger and squeeze sprayable compositions known in the art, imparts a high, uniform, gloss with long lasting shine and good fingermark resistance to surfaces. Furthermore, unlike compositions known in the art, Example 1 demonstrates the preparation of a reasonably stable pump, trigger, and squeeze sprayable composition using only low shear propeller agitation, i.e., without the need for high shear homogenization.

| Material | Wt. % |
|---|---|
| Span 80 | 0.900 |
| Tween 80 | 0.025 |
| Ethomeen 18/60 Polyoxyethylene (50) Octadecylamine (Armak) | 0.150 |
| Polymer Solution* | 2.000 |
| Isopar G | 3.000 |
| Dichevol 100 Branched Alkylbenzene (Chevron) | 1.000 |
| Silicone, 500 cstk | 2.000 |
| Perfume | 0.350 |
| Deionized Water | 90.335 |
| Formaldehyde, 37% | 0.200 |
| Carbopol 941 | 0.025 |
| Potassium Hydroxide | 0.015 |
| | 100.000 |

*15 weight percent alpha olefin maleic anhydride polymer in Isopar E solution wherein the polymer is 50 mole % maleic anhydride, 10 mole % 1-octadecene and 40 mole % mixed $C_{24}$-$C_{28}$ 1-alkene.

Lab Process for Example 1:

1. In one vessel combine the Span, Tween, Ethomeen, polymer solution, Isopar, and Dichevrol. Heat the mixture under agitation to about 50° C. to form a solution. Discontinue heating. (It is convenient to add the alpha olefin maleic anhydride polymer in the form of a pre-made solution containing 15 weight percent polymer in Isopar E. The solution is prepared by heating the polymer in the solvent to dissolve the polymer.)

2. Charge the slicone and perfume into step 1 under agitation to give a cloudy dispersion. Continue mixing to maintain dispersion uniformity. These two steps constitute the oil phase of the composition.

3. Into a separate vessel, at 25° C., charge the water, formaldehyde, and Carbopol, using low shear agitation. (It is convenient to add the Carbopol in the form of a pre-made, aqueous, 1% Carbopol solution.) Then charge the potassium hydroxide with continued agitation to thicken the aqueous Carbopol. (It is convenient to add the potassium hydroxide in the form of a pre-made, aqueous, 3% potassium hydroxide solution.) This step constitutes the water phase of the composition.

4. Slowly charge step 2 into step 3 under agitation, using the maximum mixing speed that avoids air entrapment. When the addition is complete, reduce the mixing speed and continue agitation for 30 minutes.

EXAMPLE 2

Composition and process was the same as for Example 1, except that the Ethomeen 18/60 is incorporated in the water phase. Example 2 gives product of smaller particle size, lower viscosity, and reduced stability. Phase separation by creaming occurs but the phases are readily redispersible. The performance characteristics of Example 2 are similar to those of Example 1.

EXAMPLE 3

Example 3 is the same as for Example 2 except that the water phase is added to the oil phase, and the Carbopol and potassium hydroxide intermediates are withheld until after phase inversion has occurred. Example 3 is representative of a phase inversion process.

The performance characteristics of Example 3 are comparible to those of Example 1. The initial viscosity of Example 3, together with the related properties of pump sprayability and stability to phase separation by creaming, is influenced by the rate of addition of water phase to oil phase, and can range from quite viscous to fairly fluid, as indicated previously. In the present example the product was quite viscous.

EXAMPLE 4

Example 4 is representative of a pourable liquid creme formulation prepared by the method of Example 2 except that more Carbopol is included for higher viscosity and that the Carbopol powder is dispersed in the oil phase as a slurry. Although the performance properties are fully adequate, Example 4 has slight less gloss and film uniformity than Example 1 and a somewhat decreased ease of wipe off.

| Material | Weight % |
| --- | --- |
| Span 80 | 0.900 |
| Tween 80 | 0.025 |
| Ethomeen 18/60 | 0.150 |
| Polymer solution* | 2.000 |
| Isopar G | 3.000 |
| Dichevrol 100 | 1.000 |
| Silicone, 500 cstk | 2.000 |
| Perfume | 0.350 |
| Deionized water | 90.215 |
| Formaldehyde, 37% | 0.200 |
| Carbopol 941 | 0.100 |
| Potassium hydroxide | 0.060 |
| | 100.000 |

*15 weight percent alpha olefin maleic anhydride polymer in Isopar E solution wherein the polymer is 50 mole % maleic anhydride, 10 mole % 1-octadecene and 40 mole % mixed $C_{24}$-$C_{28}$ 1-alkene.

EXAMPLE 5

Example 5 is representative of an aerosol formulation. The unpressurized intermediate for Example 5 is of the same composition and process as for Example 3, except that the Carbopol was incorporated in the oil phase per Example 4 and the potassium hydroxide was incorporated in the water phase. Pressure packaging of the intermediate was accomplished by charging an aerosol can with intermediate and propellent using standard aerosol charging techniques well known in the art. The composition of Example 5 is dischargeable as an aerosol spray and provides film characteristics comparable to Example 1.

| Material | Weight % |
| --- | --- |
| Span 80 | 0.837 |
| Tween 80 | 0.023 |
| Ethomeen 18/60 | 0.140 |
| Polymer solution* | 1.860 |
| Isopar G | 2.790 |
| Dichevrol 100 | 0.930 |
| Silicone, 500 cstk | 1.860 |
| Perfume | 0.325 |
| Deionized water | 84.012 |
| Formaldehyde, 37% | 0.186 |
| Carbopol 941 | 0.023 |
| Potassium hydroxide | 0.014 |
| Propellent, 83% isobutane/17% Propane | 7.000 |
| | 100.000 |

*15 weight percent alpha olefin maleic anhydride polymer in Isopar E solution wherein the polymer is 50 mole % maleic anhydride, 10 mole % 1-octadecene and 40 mole % mixed $C_{24}$-$C_{28}$ 1-alkene.

EXAMPLE 6

Example 6 shows a two-step process wherein a water in oil emulsion is formed first and then dispersed in the thickened water phase. The gloss imparted by Example 6, although adequate, is lower than that for Example 1 and the shine is not as long lasting. This composition is trigger syrayable.

| Material | Weight % |
| --- | --- |
| Span 80 | 0.350 |
| Tween 80 | 0.025 |
| Isopar E | 5.000 |
| Silicone, 500 cstk | 2.000 |
| Deionized water | 92.381 |
| Formaldehyde, 37% | 0.200 |
| Carbopol 941 | 0.025 |
| Potassium hydroxide | 0.019 |
| | 100.000 |

Lab Process for Example 6:

(1) To a blend of the Span 80, Tween 80, Isopar E, and silicone, slowly add 22.4% of the total water under mild agitation to give a water-in-oil emulsion.

(2) Separately, and according to the procedure of Example 1, combine the formaldehyde, Carbopol solution, and potassium hydroxide solution with the remaining 77.6% of the total water to give a thickened Carbopol solution.

(3) Under moderately vigorous agitation, slowly add the water-in-oil emulsion from Step 1 to the thickened Carbopol solution from Step 2. Mix for 30 minutes.

EXAMPLE 7

Example 7 shows use of a different Ethomeen and a very low level of Carbopol. The film properties of Example 7 are similar to those for Example 1, but this low viscosity composition is of limited stability, displaying fairly rapid phase separation by creaming.

| Material | Weight % |
| --- | --- |
| Span 80 | 0.900 |
| Tween 80 | 0.025 |
| Ethomeen C/25A | 0.015 |
| Polymer solution* | 2.000 |
| Isopar E | 1.000 |
| Isopar G | 2.000 |
| Dichevrol 100 | 0.500 |
| Silicone, 500 cstk | 2.000 |
| Deionized water | 91.344 |
| Formaldehyde, 37% | 0.200 |
| Carbopol 941 | 0.010 |
| Potassium hydroxide | 0.006 |
| | 100.000 |

*15 weight percent alpha olefin maleic anhydride polymer in Isopar E solution wherein the polymer is 50 mole % maleic anhydride, 10 mole % 1-octadecene and 40 mole % mixed $C_{24}$-$C_{28}$ 1-alkene.

EXAMPLE 8

Example 8 shows mineral oil as the film former with high level of alpha olefin maleic anhydride polymer, and was prepared by the method of Example 1, except that silicon was replaced by mineral oil, Ethomeen 18/60 was replaced by Ethomeen C/25A, and the oil phase was a clear solution rather than a cloudy dispersion. Example 8 demonstrates excellent gloss and fingermark resistance, and greatly improved film integrity relative to a conventional mineral oil polish, and is non-homogenized.

| Material | Weight % |
| --- | --- |
| Span 80 | 0.900 |
| Tween 80 | 0.025 |
| Ethomeen C/25A | 0.050 |
| Polymer solution* | 12.000 |
| Isopar G | 1.000 |
| Dichevrol 100 | 0.500 |

| Material | Weight % |
| --- | --- |
| Mineral oil | 9.000 |
| Deionized water | 76.285 |
| Formaldehyde, 37% | 0.200 |
| Carbopol 941 | 0.025 |
| Potassium hydroxide | 0.015 |
| | 100.000 |

*15 weight percent alpha olefin maleic anhydride polymer in Isopar E solution wherein the polymer is 50 mole % maleic anhydride, 10 mole % 1-octadecene and 40 mole % mixed $C_{24}$-$C_{28}$ 1-alkene.

EXAMPLE 9

Example 9 shows mineral oil without alpha olefin maleic anhydride polymer, Ethomeen, solvent or coupling oil. Example 9 is a nonhomogenized, pump srayable composition prepared by the method of Example 8, except that the indicated materials were omitted. It demonstrates reduced and fleeting, although adequate, gloss relative to Example 8.

| Material | Weight % |
| --- | --- |
| Span 80 | 0.350 |
| Tween 80 | 0.025 |
| Mineral oil | 6.000 |
| Deionized water | 93.381 |
| Formaldehyde, 37% | 0.200 |
| Carbopol 941 | 0.025 |
| Potassium hydroxide | 0.019 |
| | 100.000 |

EXAMPLE 10

Example 10 shows a different Carbopol with no high HLB emulsifier (Tween) or alpha olefin maleic anhydride polymer. Example 10 was prepared according to the method of Example 1, except for a change in Carbopols and omission of the indicated ingredients. Example 10 demonstrated a high, uniform, gloss similar to Example 1 on finished wood surfaces, but lacked film uniformity on a black, plastic laminate, type countertop surface.

| Material | Weight % |
| --- | --- |
| Span 80 | 0.900 |
| Ethomeen 18/60 | 0.150 |
| Isopar G | 4.000 |
| Dichevrol 100 | 0.500 |
| Silicone, 500 cstk | 2.000 |
| Perfume | 0.400 |
| Deionized water | 91.810 |
| Formaldehyde, 37% | 0.200 |
| Carbopol 1342 | 0.025 |
| Potassium hydroxide | 0.015 |
| | 100.000 |

EXAMPLE 11

Example 11 shows triethanolamine as a neutralizing base, and was prepared according to the method of Example 1 except for a change from potassium hydroxide to triethanolamine. The properties of Example 11 are comparable to those of Example 1 except that Example 11 displayed slightly lower stability to phase separation.

| Material | Weight % |
| --- | --- |
| Span 80 | 0.900 |
| Tween 80 | 0.025 |
| Ethomeen 18/60 | 0.150 |
| Polymer solution* | 2.000 |
| Isopar G | 3.000 |
| Dichevrol 100 | 1.000 |
| Silicone, 500 cstk | 2.000 |
| Perfume | 0.350 |
| Deionized water | 90.290 |
| Formaldehyde, 37% | 0.200 |
| Carbopol 941 | 0.025 |
| Triethanolamine | 0.060 |
| | 100.000 |

*15 weight percent alpha olefin maleic anhydride polymer in Isopar E solution wherein the polymer is 50 mole % maleic anhydride, 10 mole % 1-octadecene and 40 mole % mixed $C_{24}$-$C_{28}$ 1-alkene.

EXAMPLE 12

Example 12 shows use of a high level of Span 80 and was prepared according to the method of Example 1. The product viscosity for Example 11 is higher than when low levels of Span 80 are used. Example 11 has film properties similar to those for Example 1.

| Material | Weight % |
| --- | --- |
| Span 80 | 1.750 |
| Tween 80 | 0.025 |
| Ethomeen 18/60 | 0.050 |
| Polymer solution* | 2.000 |
| Isopar E | 1.000 |
| Isopar G | 2.000 |
| Dichevrol 100 | 0.100 |
| Silicone, 500 cstk | 2.000 |
| Deionized water | 90.817 |
| Formaldehyde, 37% | 0.200 |
| Carbopol 941 | 0.035 |
| Potassium hydroxide | 0.023 |
| | 100.000 |

*15 weight percent alpha olefin maleic anhydride polymer in Isopar E solution wherein the polymer is 50 mole % maleic anhydride, 10 mole % 1-octadecene and 40 mole % mixed $C_{24}$-$C_{28}$ 1-alkene.

EXAMPLE 13

Example 13 shows a high level of hydrocarbon solvent with no Tween, Ethomeen, maleic anhydride polymer, or coupling oil, and was prepared by the method of Example 1, except that the oil phase was a solution rather than a dispersion, and no heating was used. Example 13 has a smooth texture similar to that of Example 2, provides excellent fingermark resistance, and gives somewhat better cleaning of greasy stains then Example 1. Suprisingly, even with a high solvent level, Example 13 imparts a high gloss comparable to that of Example 1, but has less film integrity.

| Material | Weight % |
| --- | --- |
| Span 80 | 0.900 |
| Isopar E | 20.000 |
| Silicone, 500 cstk | 2.000 |
| Deionized water | 76.860 |
| Formaldehyde, 37% | 0.200 |
| Carbopol 941 | 0.025 |
| Potassium hydroxide | 0.015 |
| | 100.000 |

EXAMPLE 14

Example 14 is similar compositionally to Example 9, but includes Ethomeen 18/60 and incorporates polybutene as coupling oil. Example 14 was prepared by the method of Example 2 with the following exceptions: silicone was replaced by mineral oil, alpha olefin maleic anhydride polymer and solvent were omitted, branched alkylbenzene was replaced by polybutene as coupling oil, and the oil phase was a solution rather than a dispersion. Example 14 is a smooth, pourable liquid creme with good gloss and improved film integrity ralative to a commercially available mineral oil liquid creme product.

| Material | Weight % |
| --- | --- |
| Span 80 | 0.900 |
| Tween 80 | 0.025 |
| Ethomeen 18/60 | 0.150 |
| Polybutene 128 | 3.000 |
| Mineral oil | 17.000 |
| Perfume | 0.350 |
| Deionized water | 78.195 |
| Formaldehyde, 37% | 0.200 |
| Carbopol 941 | 0.130 |
| Potassium hydroxide | 0.050 |
| | 100.000 |

KEY TO THE EXAMPLES

Span 80 is a sorbitan monooleate nonionic surfactant marketed by ICI Americas, Inc.

Tween 80 is a polyethylene oxide (20) sorbitan monooleate nonionic surfactant marketed by ICI Americas, Inc.

Witconol 14 is a polyglyceryl-4 oleate marketed by Witco Chemical Company.

Monamid 150 ADY is a linoleamide marketed by Mono Industries, Inc.

Monamid 150 IS is an isostearamide marketed by Mono Industries, Inc.

Dichevrol 100 is a $C_{15}+$ branched alkylbenzene marketed by Chevron.

Dichevrol 500 is a blend of 25% polybutene (mol. wgt. 950) with 75% $C_{15}+$ branched alkylbenzene marketed by Chevron.

Isopar E, G, and H are isoparaffinic hydrocarbon solvents, flash points 45° F., 100° F., and 123° F. respectively, marketed by Exxon Corp.

Silicone fluids are dimethyl polysiloxane having the indicated centistoke viscosity.

Polybutene 128 is polybutene (mol. wgt. 2700) marketed by Chevron.

Ethomeen 18/60 is a polyoxyethylene (50) octadecylamine marketed by Akzo/Armak (or the Armak Division of Akzo Chemie).

Ethomeen C/25A is a polyoxyethylene (15) marketed by Akzo. Armak.

Carbopol 941 is carbomer 941, a polyacrylic acid marketed by B. F. Goodrich.

Carbopol 1342 is carbomer 1342, a polyacrylic acid marketed by B. F. Goodrich.

Quadrol is N,N,N',N'-tetrakis (2-hydroxypropyl)ethylenediamine.

I claim:

1. A method for preparing a nonhomogenized oil-in-water multi surface cleaner polish suitable for use in pump, trigger and squeeze spray dispensers, comprising:

(a) adding a thickener in an amount of about 0.01 to less than 0.1% by weight of the composition to water under moderately vigorous agitation to form a water phase wherein said thickener is a neutralized polymer of acrylic acid crosslinked with a polyfunctional agent;

(b) blending in a separate vessel one or more nonionic emulsifiers which, as a whole, have an HLB value in the range of about 4.3 to 6.7 and are present in an amount of about 0.1 to 5% by weight of the composition, nonwax film formers in an amount of from 0.5 to 20% by weight of the composition, and up to about 20% by weight of the composition of a hydrocarbon solvent to form an oil phase; and (c) dispersing the oil phase into the water phase without subjecting the ingredients being dispersed to high shear forces to form the nonhomogenized composition wherein the amount of water employed in (a) comprises the balance of said composition and said composition is essentially wax-free, sprayable, and is substantially homogeneous.

2. The method of claim 1, further including the addition of organic solvents in an amount of about 0.5 to 20% by weight of the composition, said solvents having a kauri-butanol value of about 20 to about 50 and a boiling temperature of from about 60° C. to about 210° C., to the oil phase.

3. The method of claim 1, further including adding up to about 5% by weight of the composition of an alpha olefin maleic anhydride polymer, said olefin having a carbon content of about $C_8$ about $C_{30}+$, to the oil phase of the composition.

4. The method of claim 1, further including adding about 0.05 to 5% by weight of the composition of a coupling oil selected from the group consisting of polybutenes having a molecular weight of about 95 to 2700, branched alkyl benzenes having a chain length of 12 or more, and mixtures thereof.

5. The method of claim 1 wherein said film former is a nondrying oil present in an amount of about 4 to 20% by weight of the composition.

6. The method of claim 1, wherein said film former is silicone, present in an amount of from about 0.5% to 6% by weight of the composition.

7. The method of claim 6, wherein said film former is an organic polysiloxane selected from the group consisting of polydialkyl siloxane, polyalkylaryl siloxane, polydiaryl siloxane, and mixtures thereof.

8. The method of claim 1, wherein the nonionic emulsifiers are selected from the group consisting of sorbitan esters of oleic, stearic, isostearic, palmitic and lauric acids, polyethoxylated sorbitan esters having up to about 20 ethylene oxide units, mono and diglycerides of fat forming acids, polyglyceryl oleates, fatty alkanolamides, and mixtures thereof.

9. The method of claim 1, further including pressurizing said composition in an aerosol container with about 5 to 30% by weight propellent.

10. The method of claim 1, further including the addition of about 0.015% to 0.5% by weight of the composition polyethoxylated amine surfactant to the oil phase.

11. The method of claim 1, further including the addition of about 0.015% to 0.5% by weight of the composition polyethoxylated amine surfactant to the water phase.

12. The method of claim 1 further including employing said thickener in amounts from about 0.01 to 0.04% by weight of the composition.

13. The method of claim 1 wherein the composition is free of aerosol propellant.

14. A nonhomogenized oil-in-water, multi surface cleaner polish suitable for use in pump, trigger and squeeze spray dispensers comprising the composition obtained upon performing the method of claim 1.

15. The composition of claim 14 wherein said thickener is present in amounts from about 0.01 to 0.04% by weight of the composition.

16. The composition of claim 14, further including a polyethoxylated amine surfactant.

17. The composition of claim 14, further including an alpha olefin maleic anhydride polymer in an amount of up to about 5% by weight of the composition, said olefin having a carbon content of about $C_8$ to about $C_{30}+$.

18. The composition of claim 17, further including from about 0.05 to 5% by weight of the composition of a coupling oil selected from the group consisting of polybutenes having a molecular weight of about 95 to about 2,700, branched alkyl benzenes having a chain length of 12 or more, and mixtures thereof.

19. The composition of claim 14 further including about 0.05 to 5% by weight of the composition of a coupling oil selected from the group consisting of polybutenes having a molecular weight of about 95 to about 2,700, branched alkyl benzenes having a chain length of 12 or more, and mixtures thereof.

20. The composition of claim 14, wherein said film former is silicone, present in an amount of about 0.50% to 6% by weight of the composition.

21. The composition of claim 20, wherein said film former is an organic polysiloxane selected from the group consisting of polydialkyl siloxane, polyalkylaryl siloxane, polydiaryl siloxane, and mixtures thereof.

22. The composition of claim 14, wherein said film former is a nondrying oil present in an amount of about 4% to 20% by weight of the composition.

23. The composition of claim 14 wherein said nonionic emulsifiers are selected from the group consisting of sorbitan esters of oleic, stearic, isostearic, palmitic and lauric acids, polyethoxylated sorbitan esters having up to about 20 ethylene oxide units, mono and diglycerides of fat forming fatty acids, polyglyceryl oleates, fatty alkanolamides, and mixtures thereof.

24. The composition of claim 14, further including an organic hydrocarbon solvent having a kauri-butanol value of about 20 to about 50 and a boiling range of about 60° to 210° C., said solvent present in an amount of about 0.5 to 20% by weight of the composition.

25. The composition of claim 14, wherein said solvent is an isoparaffinic solvent present in an amount of about 2% to 8% by weight of the composition.

26. The composition of claim 14, further including about 5 to 30% by weight propellent whereby said compositions is dispensed from a pressurized container.

27. The composition of claim 14 wherein the composition is free of aerosol propellant.

28. A method for preparing a nonhomogenized oil-in-water multi surface cleaner polish suitable for use in pump, trigger and squeeze spray dispensers, comprising:
(a) blending in a separate vessel one or more nonionic emulsifiers which, as a whole, have an HLB value in the range of about 4.3 to 6.7 and are present in an amount of about 0.1 to 5% by weight of the composition, a thickener in an amount of about 0.01 to less than 0.1% by weight of the composition wherein said thickener is a neutralized polymer of acrylic acid crosslinked with a polyfunctional agent; nonwax film formers in an amount of from 0.5 to 20% by weight of the composition, and optionally, up to about 20% by weight of the composition of a hydrocarbon solvent to form an oil phase;
(b) adding a base for neutralizing said thickener to water under agitation to form a water phase, said water comprising the balance of said composition; and
(c) dispersing the oil phase into the water phase without subjecting the ingredients being dispersed to high shear forces to form the nonhomogenized composition wherein said composition is essentially wax-free, sprayable, and is substantially homogeneous.

29. The method of claim 28, further including pressurizing said composition in an aerosol container with about 5 to 30% by weight propellent.

30. The method of claim 28 wherein the composition is free of aerosol propellant.

31. The method of claim 28 further including employing said thickener in amounts of from about 0.01 to 0.04% by weight of the composition.

* * * * *